(12) United States Patent
McCombs et al.

(10) Patent No.: US 9,360,100 B2
(45) Date of Patent: Jun. 7, 2016

(54) METHOD, SYSTEM AND APPARATUS TO PROVIDE FOR UNIVERSAL BELLHOUSING BETWEEN ENGINE AND TRANSMISSION OF VEHICLE

(71) Applicant: Accel Performance Group LLC, Cleveland, OH (US)

(72) Inventors: Ross McCombs, Oskaloosa, IA (US); Joseph Patrick Glenn, Foreston, MN (US)

(73) Assignee: Accel Performance Group LLC, Bowling Green, KY (US)

( * ) Notice: Subject to any disclaimer, the term of this patent is extended or adjusted under 35 U.S.C. 154(b) by 0 days.

(21) Appl. No.: 14/032,700

(22) Filed: Sep. 20, 2013

(65) Prior Publication Data
US 2014/0020505 A1 Jan. 23, 2014

Related U.S. Application Data

(62) Division of application No. 12/258,912, filed on Oct. 27, 2008, now Pat. No. 8,561,283.

(60) Provisional application No. 60/983,347, filed on Oct. 29, 2007.

(51) Int. Cl.
*F16H 57/02* (2012.01)
*B21D 22/16* (2006.01)

(52) U.S. Cl.
CPC ............... *F16H 57/02* (2013.01); *B21D 22/16* (2013.01); *Y10T 29/49996* (2015.01); *Y10T 74/2186* (2015.01)

(58) Field of Classification Search
CPC .............. F15H 2057/02017; F15H 2057/0203; F15H 2057/02082; F16D 2300/06; B21D 22/14; B21D 22/16; B21D 22/18
USPC .......... 29/888.01, 525.14, 558, 557, 894.351, 29/432.1, 515, 421.1, 27 C, 26 A; 72/82, 72/83, 85, 86, 90, 333, 473.1; 984/126; 228/44.3, 164, 170; 123/195 C, 198 P; 74/609, 908, 606 R
See application file for complete search history.

(56) References Cited

U.S. PATENT DOCUMENTS

| | | | | |
|---|---|---|---|---|
| 157,272 | A | * | 12/1874 | Conger .................. B21D 22/18 72/81 |
| 603,094 | A | * | 4/1898 | Worth ............................... 72/85 |
| 1,824,440 | A | * | 9/1931 | Meyer ......................... 74/606 R |
| 1,939,356 | A | * | 12/1933 | Lindgren ........................... 72/83 |
| 2,982,150 | A | * | 5/1961 | Kolbe ......................... 464/68.91 |
| 3,696,689 | A | * | 10/1972 | Senter et al. ..................... 74/609 |
| 3,772,938 | A | * | 11/1973 | Johnson ...................... 74/606 R |

(Continued)

OTHER PUBLICATIONS

Quicktime Inc Product Listing Dec. 1, 2005 [online]. www.quicktimeinc.com/products.html [retrieved on May 10, 2011]. Retrieved from Internet Archive http://replay.web.archive.org.*

*Primary Examiner* — Jason L Vaughan
(74) *Attorney, Agent, or Firm* — Standley Law Group LLP

(57) ABSTRACT

A universal bellhousing which may be adapted to a variety of automotive engine and transmission combinations and method of making the same is disclosed. The bellhousing is made by spin forming a sheet of steel and welding a transmission plate onto the cone. The cone and transmission plate are indexed to mount to a specified engine-transmission combination.

6 Claims, 6 Drawing Sheets

(56) References Cited

U.S. PATENT DOCUMENTS

| | | | | |
|---|---|---|---|---|
| 3,841,290 A | * | 10/1974 | Schubeck | 123/195 A |
| 4,478,593 A | * | 10/1984 | Brown | 464/182 |
| 4,641,547 A | * | 2/1987 | Stich et al. | 74/606 R |
| 4,955,343 A | * | 9/1990 | Ogami | 123/195 R |
| 5,203,441 A | * | 4/1993 | Monette | 192/112 |
| 5,267,488 A | * | 12/1993 | Hardeman et al. | 74/606 R |
| 5,473,808 A | * | 12/1995 | Winters, Sr. | 29/527.6 |
| 5,566,591 A | * | 10/1996 | Burkett | 74/606 R |

* cited by examiner

METHOD, SYSTEM AND APPARATUS TO PROVIDE FOR UNIVERSAL BELLHOUSING BETWEEN ENGINE AND TRANSMISSION OF VEHICLE

CROSS REFERENCE TO RELATED APPLICATIONS

This application is a divisional of U.S. patent application Ser. No. 12/258,912 filed on Oct. 27, 2008, which claims priority to U.S. Provisional Application No. 60/983,347 filed on Oct. 29, 2007. The disclosure of these applications are hereby incorporated by reference in their entirety.

BACKGROUND OF THE INVENTION

Transferring power from a rotating engine or motor to a transmission or other implement requires an attachment mechanism to absorb the rotational torque differential between the engine and the desired transmission or implement. The attachment maintains a specific relationship of the components to prevent unwanted loss of energy from friction associated with misalignment of the rotating shaft from the motor with a transmission or other component. Additional consideration is given for the forces generated from the environment the assembly is to be employed. In an internal combustion engine the area between the engine and the transmission is commonly called a bellhousing. Historically Automobile, Truck, and Implement Manufacturers have provided their bellhousings from several processes; namely metal casting; metal pressing using dies and presses and occasionally a hydro form pressing method requiring a less costly form of die.

A bellhousing also provides an area for controlling power transfer from the motor to the attachment to it.

Inside the bellhousing a clutching mechanism and often a starting system for the motor is placed. The bellhousing encapsulates these mechanisms protecting the components from the outside environment and hopefully contains any failure of the components within the bellhousing.

Bellhousings are attached to the motor with taps and commonly to the transmission or implement with taps. The pattern of the tapped holes varies from manufacturer to manufacture and from motor type to motor type as well as transmission type to transmission type. Additional variations occur within subgroups from above to accommodate the clutching and starting systems required for each application. Manufacturers most often design and build a casting from aluminum or iron for each application. The process requires a large commitment of capital and time designing the molds. They can only justify the large initial startup costs through the economics of mass production.

The manufacturer is faced with a tradeoff of weight versus strength when selecting either aluminum or steel. In the marketplace there has developed a need for a lighter weight steel bellhousing to accommodate the manufacturer's production needs. New high torque engines create stresses that cause failure of the traditional cast bellhousing.

In areas of motor sports all the circumstances above; flexibility of application; strength versus weight; production cost; and safety are equally important. Most motor-sport sanctioning bodies are now requiring bellhousings capable of containing all the components within the bellhousing in the event of a failure. Most require a steel bellhousing. Modern engines are producing torque in excess of the design parameters of traditional bellhousing. The consumer desires an affordable and safe bellhousing that can be tailored to multiple combinations common in their competition. This market is not economically viable for traditional mass production methods since the price per piece is not sufficiently off set by production numbers.

Automotive restoration and modification has demands similar to the motor sport consumer. The flexibility and strength of the spun bellhousing enables combinations of almost any imaginable at a reasonable cost. Likewise, all high torque, limited production applications of rotating energy from a motor to an attachment will benefit from the lower per unit cost of spun bellhousing.

BRIEF SUMMARY OF THE INVENTION

The present invention generally relates to an improved attachment, hereafter "bellhousing," for use in rotating power transmission systems. The bellhousing is formed from a sheet of metal into a generally coned shaped housing having an integrally formed flange extending from the cone. A plate is attached onto the opposing end of the cone that attaches to a transmission or other implement. This assembly is then machined and cut to accommodate any number of motor to transmission or implement combinations.

The process reflects the latest in technological advances in metallurgy and metal spinning. When first introduced, modern high strength alloys exceeded the existing capabilities of traditional metal spinning. Recent improvements in metal spinning now allow high strength alloys to be formed in a spin forming machine.

A spun bellhousing from a high strength alloy maintains its shape since the spin forming eliminates residual stress associated with tradition pressing methods. The combination of modern alloys and high power spinning machines eliminates the costly development of molds for casting or forms for pressing or hydro forming. The finished product is stronger, lighter, and stable than traditional pressed or cast attachments. The process allows short production runs decreasing per unit costs and the benefits of infinite flexibility. Modern spin forming and alloys provide a safer, stronger more stable product with fewer costs than the other processes.

The present invention generally relates to an improved bellhousing for use in an automobile, the bellhousing being formed by spin forming a sheet of metal into a generally cone shaped housing having an integrally formed flange extending from the cone. A transmission plate is then welded onto the cone. Finally, the transmission plate and integrally formed flange are shaped and cut to accommodate any number of engine and transmission combinations.

The process of making such a bellhousing does not require the development of forms, such as those required for hydroforming or pressing, and may be formed from steel plate, thereby increasing the safety factor of the bellhousing. Additionally, a variety of engine and transmission combinations may be used without expensive or weighty adapter plates between the bellhousing and engine or transmission. The spin forming step also eliminates residual stress in the bellhousing, further increasing its safety qualities.

DETAILED DESCRIPTION OF THE PREFERRED EMBODIMENT

Figure 1:
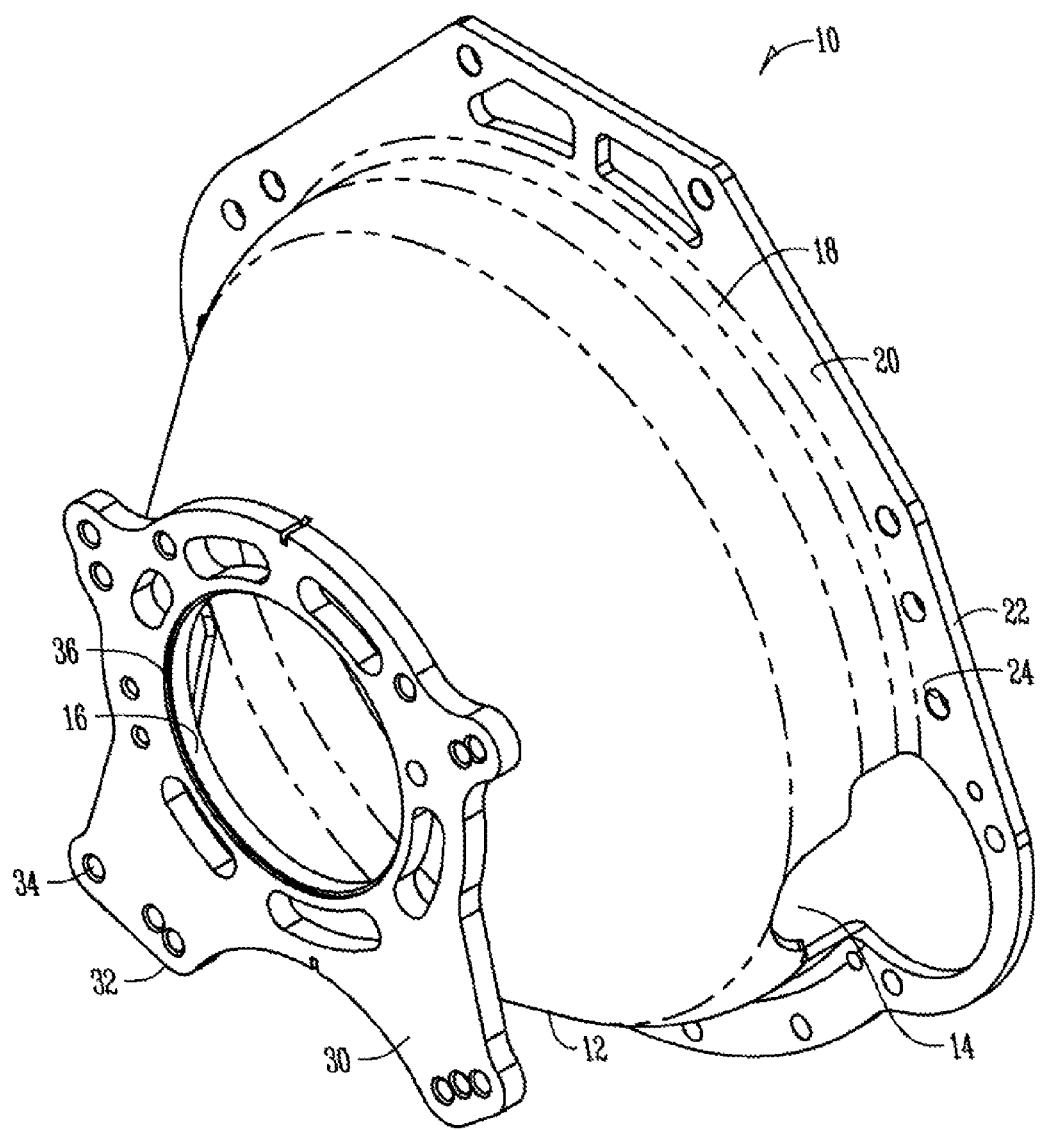
FIG. 1 is a perspective view of the bellhousing according to a preferred embodiment.
Figure 2:
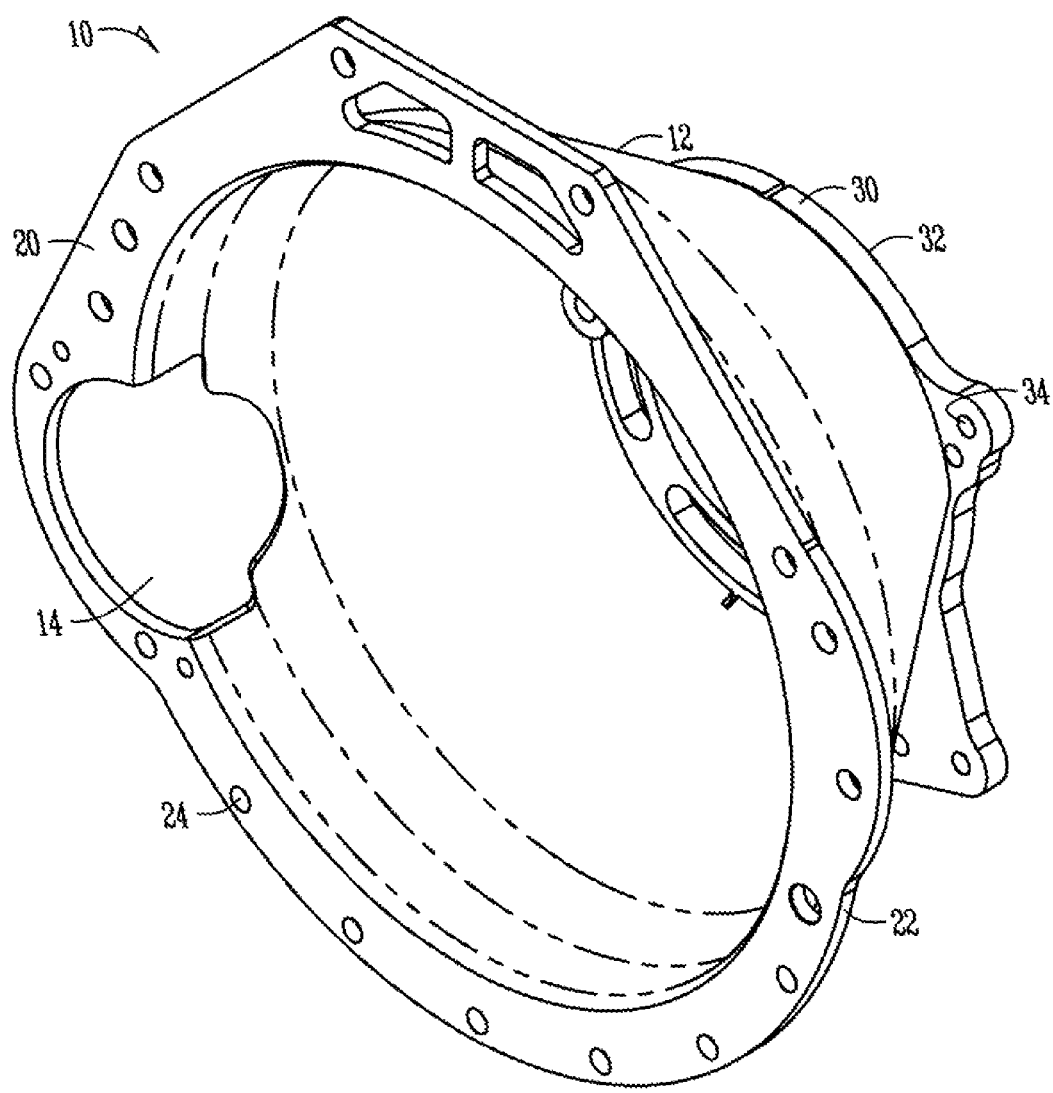
FIG. 2 is a perspective view of the bellhousing from an opposite end.
Figure 3:
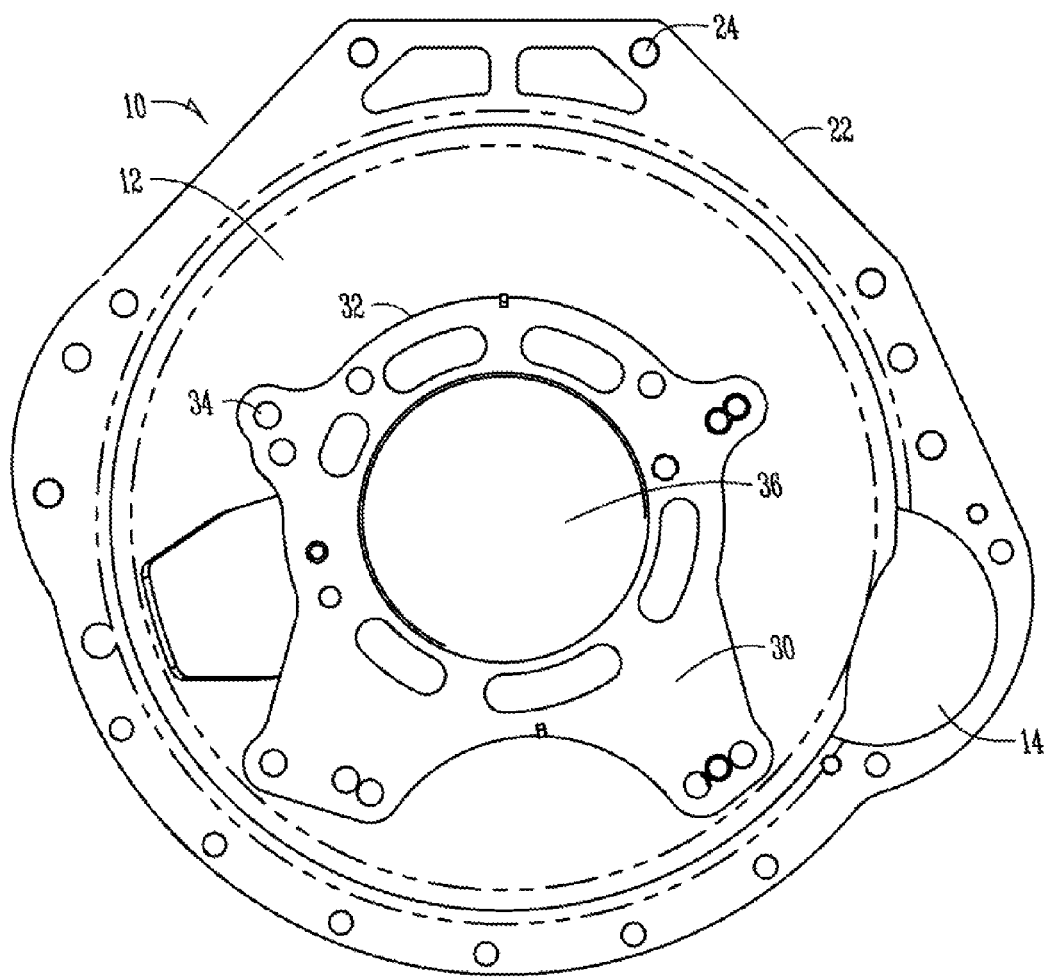
FIG. 3 is an end view of the preferred embodiment.
Figure 4:
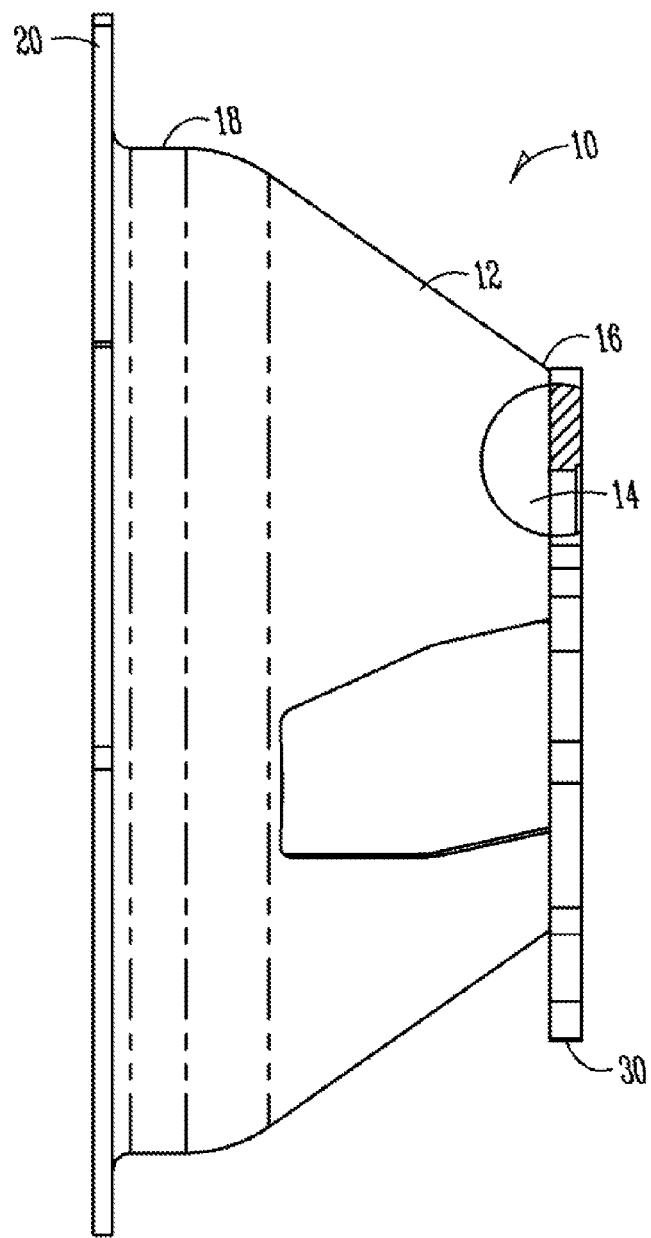
FIG. 4 is a side view of the preferred embodiment.

An embodiment of this invention is a universal bellhousing design and manufacturing process that allows a small number of housing sizes to be configured to mate with a large number of engine and transmission models. This is an important aspect of this invention as each engine and transmission has a unique mounting pattern and size and thus would require separate tooling.

As shown in FIGS. 1-4, the bellhousing 10 generally comprises a cone 12, a flange 20, and a transmission plate 30. The flange 20 has a hole pattern 24 corresponding to a mating surface on an engine. The transmission plate 30 also has a hole pattern 34 and a profile 32 corresponding to a transmission. The cone 12 also features a number of openings 14 which allow the bellhousing 12 to fit about the engine transmission interface while allowing access for the shifter cable and starter. The arrangement of the openings 14, and the hole pattern 24 on the flange 20 and hole pattern 34 on the transmission plate 30 are shown merely by example, as each engine-transmission combination may require different shapes or arrangement of these features.

As previously discussed, there are different methods available for the construction of bellhousings. These methods include hydroforming, casting, or pressing. Each of these methods is not preferable for custom made bellhousings because of an increased startup cost as well as limitations in the type of material which may be used.

The present invention contemplates the use of spin forming to form the basic bellhousing shape. The process is generally shown in FIGS. 5A and 5B, with the specific assembly process for the bellhousing shown in FIG. 6.

Figure 5A:
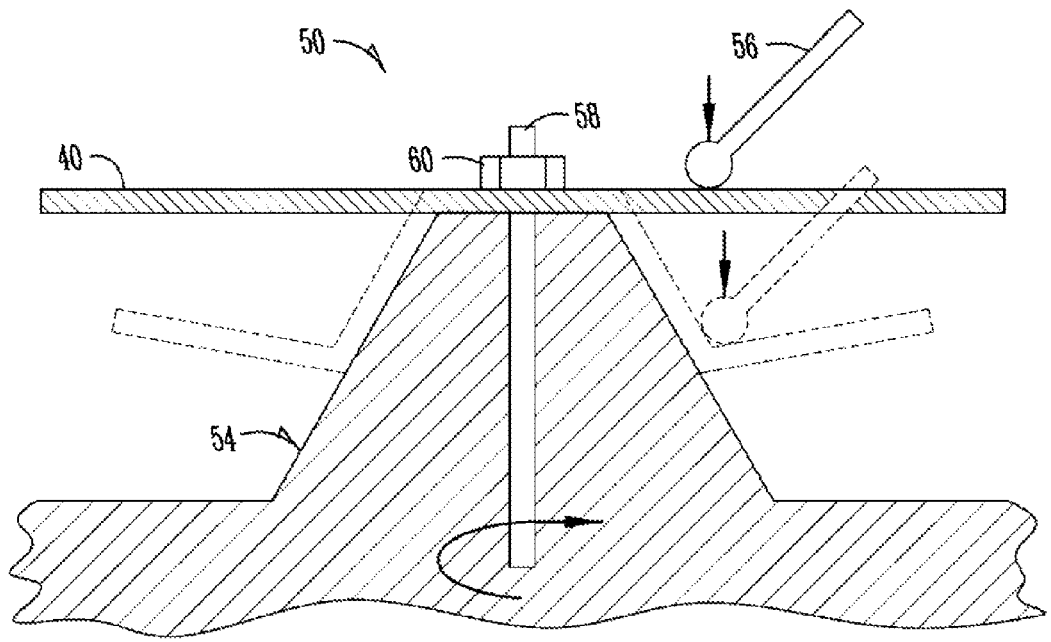
FIG. 5A shows a method of forming the bellhousing by use of an external spin forming machine.
Figure 5B:
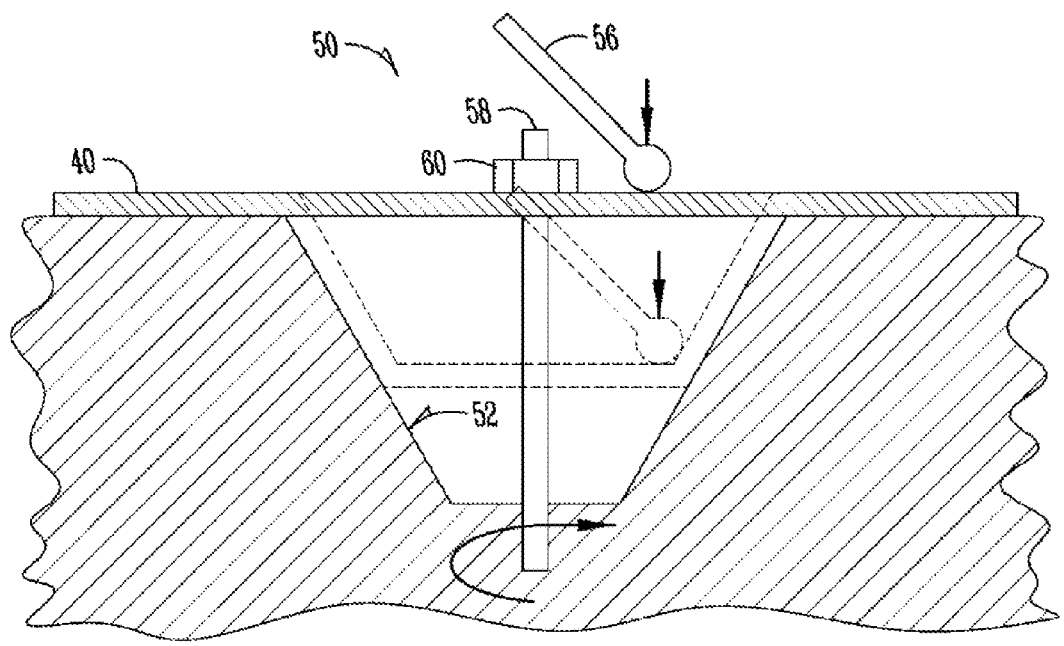
FIG. 5B shows a method of forming the bellhousing by use of an internal spin forming machine.

FIGS. 5A and 5B show alternative methods of spin forming a sheet of steel into a cone for use in the bellhousing. FIG. 5A shows the use of an external type spin forming and FIG. 5B shows the use of an internal type spin forming FIG. 5B shows internal-type spin forming. A sheet of steel 40 is placed onto the spinning machine 50 with the central axis 58 passing through the indexing hole 42. The sheet 40 is then secured by a support 60 and spun at a high speed. As the sheet 40 spins, a roller 56 exerts force downward onto the sheet 40 forcing it into the cavity 52. The sheet 40 is shaped to the cavity 52 while leaving a flange 20 integrally formed about the edge of the cavity 52.

External spin forming is generally shown in FIG. 5A. In this method, a sheet of steel 40 is placed onto a spinning machine 50 atop a mandrel 54. The central axis 58 passes through the indexing hole 42 and the sheet 40 is secured with a support 60. The sheet 40 is then spun at high speed and a roller 56 forces the sheet about the mandrel 54. In this manner, a cone shape is formed about the mandrel with a flange 20 integrally formed with the cone 12. As shown in FIG. 5B, once the cone 12 is formed, the flange 20 is not level to the cone 12. Therefore, a separate step is required to level the flange 20 prior to final machining. This step could be performed by a press or other similar process known in the art.

Figure 6:
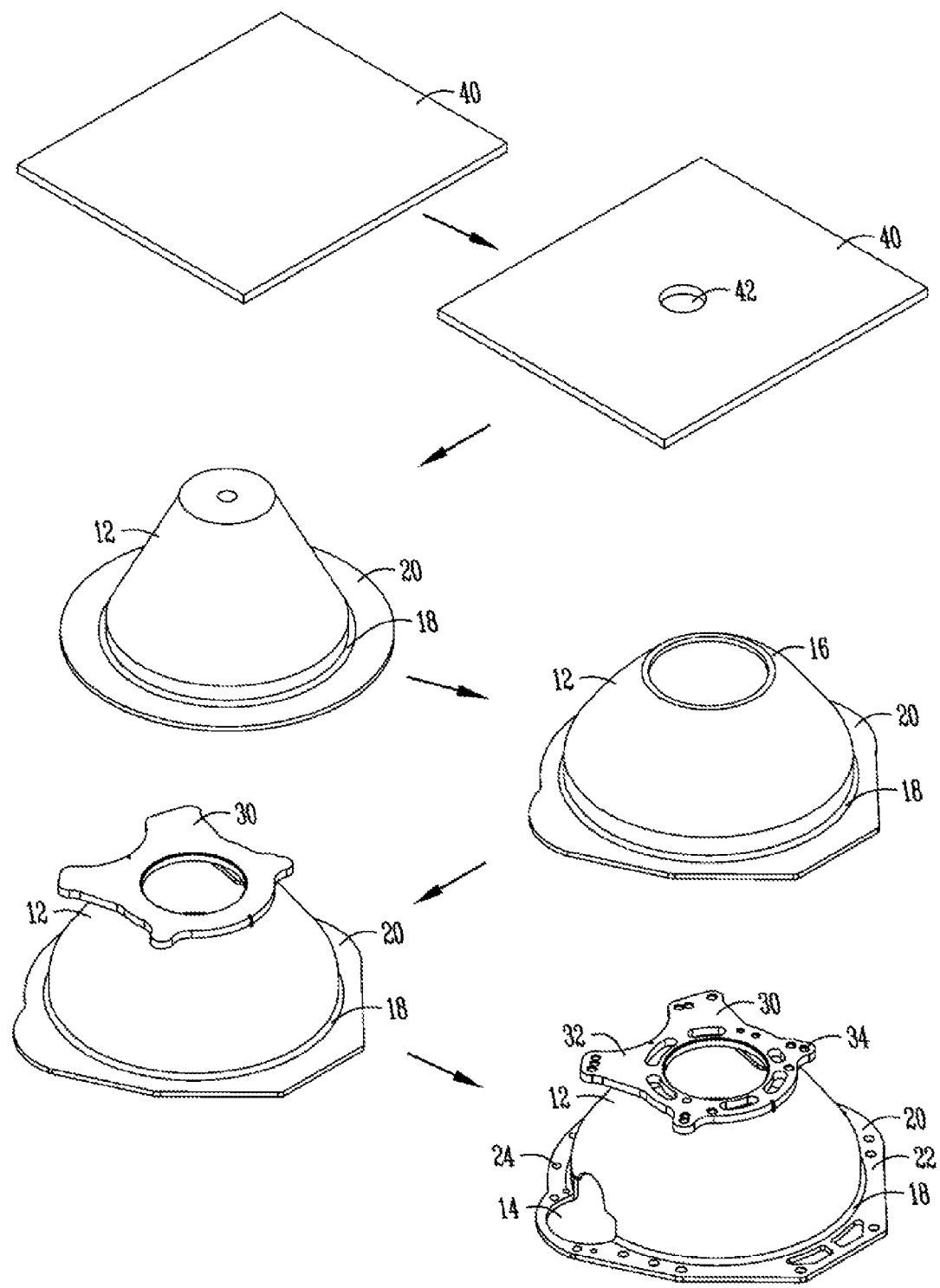
FIG. 6 shows the various steps in producing the bellhousing according to the preferred embodiment.

As shown in FIG. 6, the process starts with a single sheet 40 of steel, preferably ⅜" for safety reasons.

Next, an indexing hole 42 is drilled through the center of the sheet 40; this hole 42 is preferably approximately 1" in diameter and is used to align the sheet 40 onto the spinning machine 50.

The sheet 40 is then formed by spin forming into a cone 12 with a narrow end 16, a wide end 18, and a flange 20 extending from the wide end 18. The cone is defined by its height, diameter and angle of taper.

The cone 12 is next cut to a preferred height relative to the flange 20. This distance is determined by the precise specifications between the engine and transmission. Along with cutting the cone height, noncritical operations are also performed. The openings 14 are also cut and the profile 22 of the flange is cut. These features are not held to the tight tolerances of the transmission and engine interfaces, and so may be performed at this stage. The cuts are preferably performed by an automated 5-axis laser cutter. Being automated, such as by CNC, individual bellhousing profiles may be stored and retrieved according to production demands. The 5-axis laser cutter eliminates error due to moving the part and allows cuts to be made at a variety of positions and angles.

The transmission plate 30, already having a profile 32 and center hole 36 for aligning with the transmission, is then welded onto the narrow end 16 of the cone 12. As with the flange profile 22, the transmission profile 32 is not required to be held to a tight tolerance. Therefore, a number of transmission plates 30 corresponding to a variety of different transmissions may be cut before welding the transmission plate 30 to the bellhousing 10. The central hole 36 of the transmission plate 30 is within a tolerance (e.g., 0.1") of the final dimension. This central hole 36 is centered onto the cone 12, thereby ensuring concentricity between the flange 20 and transmission plate 30.

As a final step, the bellhousing 10 is moved to a table for precision machining. First, the transmission plate 30 and flange 20 are leveled relative to one another to a precision tolerance (e.g., 0.001"). The hole pattern 24 in the flange 20 is then cut, including precision fit dowels. The central hole 36 and hole pattern 34 of the transmission plate 30 are also cut at this time, corresponding to the selected transmission. All of the operations in the final step are performed on a single machine, thereby ensuring a precise tolerance (e.g., 0.001").

As has been previously described, the method of forming the bellhousing allows for a variety of transmission and engine combinations to be assembled together through the use of a single bellhousing. It should be appreciated to those skilled in the art that alternative embodiments of the method of forming the bellhousing may also be used. For example, the cone may be formed by hydroforming, pressing, or casting. The remaining steps would then be followed as described above in order to produce a universal bellhousing.

Hydroforming is a process by which a form is pressed out of a sheet of metal by the use of hydraulic pressure. The sheet of metal is placed onto a flexible diaphragm and a male mold is pressed into the sheet. Hydraulic pressure provides the energy for deforming the sheet. The flexible diaphragm provides resistance, thereby eliminating the need for a complimentary female mold. This type of metal forming is inexpensive as it does not require complimentary molds and can be used for a variety of shapes.

Pressing is a process by which a form is pressed out of a sheet of metal by a ram. The sheet of metal is placed onto a female die and a ram forces a male die onto the sheet. The sheet is then formed into the shape formed by the dies. This process is faster than hydraulic pressing, but requires more startup cost to form the dies.

Casting is a process of depositing molten metal into a form and then cooling the metal to set the form. The form must be designed for each individual bellhousing. This process requires a high startup cost, and is generally not suitable for use with high-strength steel. However, the process is preferred for large quantities of products.

Other alternative processes obvious to those in the field of art are considered to be included in this invention. The above description is merely a single embodiment and limitations to the invention are described in the patent.

What is claimed is:

1. A bellhousing for connecting an engine to a transmission, each having a mounting surface, the bellhousing comprising:
    a cone having an axis, a wide end, and a narrow end, the cone formed by deforming a spinning sheet of metal into a mold using an internal spin forming process which asserts a force to the spinning sheet of metal, such force applied along the inner surface of the sheet of metal as it is formed into a cone;
    a flange formed from the spinning sheet and integral to the cone, extending from the wide end of the cone normal to the axis;
    a transmission plate affixed onto the narrow end of the cone; and
    a pattern of holes machined into the flange and transmission plate, the pattern of holes being indexed to an engine and transmission.

2. The bellhousing of claim 1 wherein the applied force is continuously normal to the spinning sheet of metal.

3. The bellhousing of claim 1 wherein the transmission plate is affixed by welding to the cone distal from the flange.

4. A bellhousing for connecting an engine to a transmission, each having a mounting surface, the bellhousing comprising:
    a cone having an axis, a wide end, and a narrow end, the cone formed by deforming a spinning sheet of metal onto a mandrel using an external spin forming process which asserts a force continuously normal to the spinning sheet of metal, such force applied along the outer surface of the sheet of metal as it is formed into a cone;
    a flange formed from the spinning sheet and integral to the cone, extending from the wide end of the cone normal to the axis;
    a transmission plate affixed onto the narrow end of the cone; and
    a pattern of holes machined into the flange and transmission plate, the pattern of holes being indexed to an engine and transmission.

5. The bellhousing of claim 4 wherein the transmission plate is affixed by welding to the cone distal from the flange.

6. The bellhousing of claim 4 wherein the applied force is continuously normal to the spinning sheet of metal.

* * * * *